United States Patent [19]
Yoshida et al.

[11] Patent Number: 4,713,107
[45] Date of Patent: Dec. 15, 1987

[54] APPARATUS FOR PRODUCING POROUS PREFORMS FOR OPTICAL FIBERS

[75] Inventors: Masaaki Yoshida; Shigeki Endo; Shigeru Kisanuki; Hideo Kakuzen, all of Kanagawa, Japan

[73] Assignee: Sumitomo Electric Industries, Ltd., Osaka, Japan

[21] Appl. No.: 940,203

[22] Filed: Dec. 10, 1986

Related U.S. Application Data

[63] Continuation of Ser. No. 720,223, Apr. 5, 1985, abandoned.

[30] Foreign Application Priority Data

Apr. 6, 1984 [JP] Japan .................. 59-69569

[51] Int. Cl.$^4$ .................. C03B 37/018
[52] U.S. Cl. .................. 65/157; 65/18.2; 65/144; 118/715; 118/308
[58] Field of Search ............ 65/157, 144, 3.12, 18.2; 118/715, 723, 725, 308; 55/117, 119, 120, 129, 130; 422/240, 241, 186; 427/255, 167, 166, 163

[56] References Cited

U.S. PATENT DOCUMENTS

| | | | |
|---|---|---|---|
| 4,421,540 | 12/1983 | Nakahara | 65/3.12 |
| 4,435,199 | 3/1984 | Potkay | 65/144 X |
| 4,547,404 | 10/1985 | Campbell | 427/255 |

FOREIGN PATENT DOCUMENTS

| | | | |
|---|---|---|---|
| 2821131 | 11/1979 | Fed. Rep. of Germany | 118/715 |
| 49-15356 | 4/1974 | Japan | 118/715 |

*Primary Examiner*—Kenneth M. Schor
*Attorney, Agent, or Firm*—Sughrue, Mion, Zinn, Macpeak & Seas

[57] ABSTRACT

An apparatus is provided for the production of a porous preform of $SiO_2$ used in the manufacture of optical fiber wherein damage to the preform caused by falling clusters of $SiO_2$ or $GeO_2$ formed on the wall of the deposition chamber is eliminated. In accordance with the invention, a conductive shielding member is provided inside the wall defining the deposition chamber. This shielding member eliminates an electrostatic field produced on the wall by charging, therefore preventing the adherence of fine particles thereto.

3 Claims, 2 Drawing Figures

4,713,107

APPARATUS FOR PRODUCING POROUS PREFORMS FOR OPTICAL FIBERS

This is a continuation of application Ser. No. 720,223 filed Apr. 5, 1985, now abandoned.

BACKGROUND OF THE INVENTION

The present invention relates primarily to an improved VAD (Vapor-phase Axial Deposition) apparatus used for producing porous preforms for optical fiber production. The invention may be applied as well, however, to a so-called "outside vapor-phase oxidation" method, the basic principles of which are the same as employed with the VAD apparatus.

A conventional VAD apparatus is depicted schematically in FIG. 1. In FIG. 1, reference numeral 3 indicates an oxyhydrogen burner employing a mixture of oxygen and hydrogen as a combustion gas. The burner 3 also includes passages through which gases such as $SiCl_4$, $GeCl_4$, Ar, etc., are passed to the flame 4. Consequently, there are produced fine particles of $SiO_2$, $GeO_2$, etc. the fine particles of $SiO_2$ or $GeO_2$ are deposited on a target member 2, which may be a quartz bar, to grow a porous preform 1 thereon. Reference numeral 5 indicates a wall (sometimes called a "muffle") which defines a deposition chamber around the preform 1. The wall 5 can be made of ordinary glass, quartz glass, or the like. A discharge hole 6 is formed in one side of wall 5, and the stem of the target member 2 extends upwardly through another passage formed at the upper end of the chamber.

The conventional apparatus of FIG. 1 suffers a serious drawback. That is, because the wall 5 is subject to electrostatic charging and the particles themselves are charged, clusters of particles tend to collect on the wall 5. Some of these clusters near the top of the chamber, when they become sufficiently large, drop off the wall 5 and strike the growing preform 1 causing nonuniformities therein. Others of the following clusters may fall into the flame 4, resulting in nonuniform scattering and again nonuniformities in the growing porous preform 1. Such a preform may be unsuitable for use in the production of optical fibers.

SUMMARY OF THE INVENTION

Accordingly, an object of the invention is to provide a VAD apparatus in which the above-discussed drawbacks have been eliminated.

More specifically, it is an object of the present invention to provide a VAD apparatus in which the adherence of fine $SiO_2$ or $GeO_2$ particles to the wall of a deposition chamber of the apparatus is eliminated.

In accordance with the above and other objects, the invention provides a VAD apparatus comprising at least one wall defining a deposition chamber; burner means for producing fine particles for deposition of a porous preform; and means for electrostatically shielding the at least one wall from the porous preform. The shielding means is preferably a member of electrically conductive material provided inside the wall surrounding the preform and the flame of the burner means.

With the VAD apparatus of the present invention, an electrostatic field produced by an electrostatically charged wall of the deposition chamber is canceled, thereby preventing fine particles of $SiO_2$ or $GeO_2$ from depositing on the wall. Accordingly, a porous preform produced with the VAD apparatus of the present invention is much more uniform than can be attained with the conventional apparatus.

DESCRIPTION OF THE PREFERRED EMBODIMENTS

Figure 1:
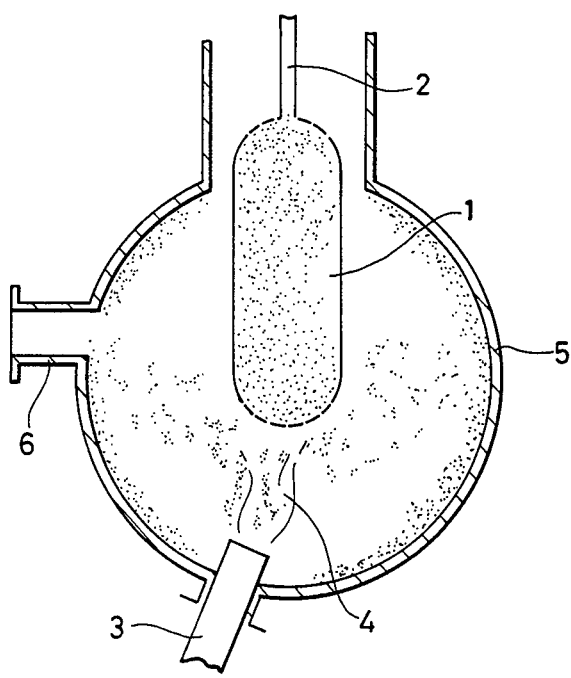
FIG. 1 shows a schematic view of a conventional VAD apparatus.
Figure 2:
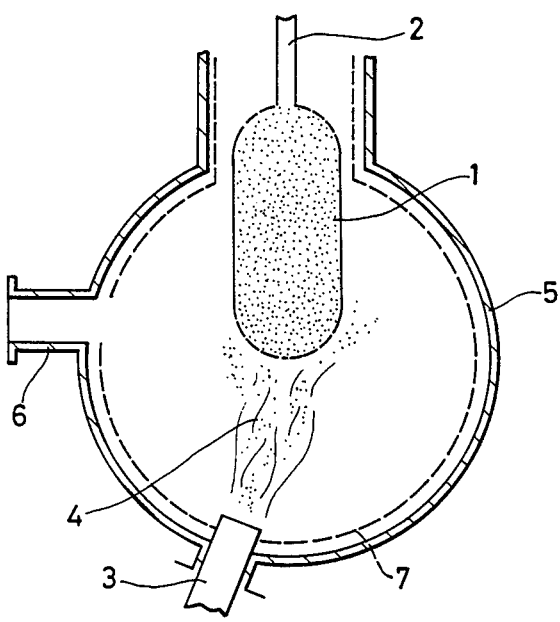
FIG. 2 shows a schematic view of a VAD apparatus constructed in accordance with the present invention.

Referring not to FIG. 2, a preferred embodiment of a VAD apparatus of the present invention will be described. In FIG. 2, reference numerals employed commonly in FIG. 1 denote like elements, and a further detailed description of those elements will consequently be omitted.

In accordance with the invention, a shielding member 7 is provided adjacent the inner surface of the wall 5, conforming as closely as possible to the shape thereof. The shielding member 7 should surround the porous preform 1 and the flame 4. A mesh-type shielding member may be employed. Of course, it is necessary to provide apertures in the shielding member 7 for passage therethrough of the oxyhydrogen burner 3 and the target member 2.

By forming the shielding member 7 so as to surround the preform 1 and flame 4 as described above and as shown in FIG. 2, shielding member 7 cancels out the effect of any electrostatic field arising due to charges present on the outer wall 5 in accordance with Gauss Theorem. Therefore, fine particles of $SiO_2$ or $GeO_2$ are prevented from depositing on the inner surface on the wall 5. Accordingly, damage to the preform 1, as unavoidably occurred in the conventional VAD apparatus, is positively eliminated. That is, there is no danger of damage to the preform 1 by falling clusters of particles striking the preform 1 or particles scattered nonuniformally upon falling into the flame 4. Hence, porous preforms of very high quality and having a desired shape can easily be produced with the use of the invention.

Although, in the above-described embodiment, the wall 5 and the shielding member 7 have a spherical form, other shell shapes may be used as well, for instance, a cylindrical shape. For the material of the shielding member, aluminum is preferred, although various other materials can be used as well.

This completes the description of the preferred embodiments of the invention. Although preferred embodiments have been described, it is believed that numerous modifications and alterations thereto would be apparent to one of ordinary skill in the art without departing from the spirit and scope of the invention.

We claim:

1. An apparatus for producing a porous preform for use in producing optical fiber, said apparatus comprising: a target member (2) upon which a porous preform (1) is to be grown; an enclosure wall (5) defining a deposition chamber, said wall having an elongate passage formed therein for receiving said target member, said target member being disposed in said passage and extending into the interior of said chamber, an aperture defined ins aid enclosure wall, and a discharge outlet (6) defined in said enclosure wall; an oxyhydrogen burner (3) for producing a flame for generating fine solid electrically charged particles of $SiO_2$ having a first electrical polarity, means for providing reactants to said burner such that said fine solid particles of $SiO_2$ are generated, said burner being disposed in said aperture in communication with the interior of said chamber such that the flame extends into said chamber, whereby some of said charged particles contact an inner surface of said enclosure wall thereby causing an electrostatic field force which is opposite in electrical polarity to said first polarity to be formed on the inner surface of said enclosure wall; and an electrically conductive metal mesh shielding member (7), disposed inside said wall and substantially surrounding said target member and the flame, said shielding member being located for and being a means for substantially preventing the electrostatic field force from exerting an attractive force on any of said particles of $SiO_2$ located within said shielding member.

2. The apparatus of claim 1, wherein said shielding member conforms in shape to an inner shape of said enclosure wall.

3. The apparatus of claim 1, wherein said shielding member is made of aluminum.

* * * * *